(12) United States Patent
Brassil

(10) Patent No.: US 12,439,910 B2
(45) Date of Patent: Oct. 14, 2025

(54) APPARATUS AND METHOD FOR SUSTAINING AND EVALUATING ISOLATED ORGANS

(71) Applicant: John M. Brassil, Lake Mills, WI (US)

(72) Inventor: John M. Brassil, Lake Mills, WI (US)

( * ) Notice: Subject to any disclaimer, the term of this patent is extended or adjusted under 35 U.S.C. 154(b) by 1054 days.

(21) Appl. No.: 17/361,071

(22) Filed: Jun. 28, 2021

(65) Prior Publication Data

US 2022/0408720 A1   Dec. 29, 2022

(51) Int. Cl.
| | | |
|---|---|---|
| *A01N 1/10* | (2025.01) | |
| *A01N 1/122* | (2025.01) | |
| *A01N 1/143* | (2025.01) | |
| *A61L 2/00* | (2006.01) | |

(52) U.S. Cl.
CPC ............. *A01N 1/143* (2025.01); *A01N 1/122* (2025.01); *A61L 2/0047* (2013.01); *A61L 2202/21* (2013.01)

(58) Field of Classification Search
CPC .... A01N 1/0247; A01N 1/021; A01N 1/0294; A61L 2/0047; A61L 2202/21
See application file for complete search history.

(56) References Cited

U.S. PATENT DOCUMENTS

| | | |
|---|---|---|
| 4,112,070 A | 9/1978 | Harmening |
| 4,666,425 A | 5/1987 | Fleming |
| 5,716,378 A | 2/1998 | Minten |
| 7,410,474 B1 | 8/2008 | Friend et al. |
| 8,349,550 B2 * | 1/2013 | Brady ...................... B01J 20/26 435/284.1 |
| 8,741,555 B2 | 6/2014 | Brassil et al. |

(Continued)

FOREIGN PATENT DOCUMENTS

| | | | |
|---|---|---|---|
| CN | 110506734 A | * 11/2019 | |
| WO | WO-2019141809 A1 | * 7/2019 | ........... A01N 1/0215 |

OTHER PUBLICATIONS

Cui et al., "High-density culture of Lactobacillus plantarum coupled with a lactic acid removal system with anion-exchange resins." Biochemical Engineering Journal 115 (2016): 80-84. (Year: 2016).*

(Continued)

*Primary Examiner* — Liban M Hassan
(74) *Attorney, Agent, or Firm* — Stiennon & Stiennon

(57) ABSTRACT

An organ preservation system having; an organ chamber with a perfusate reservoir, a pump arranged to circulate perfusate, from the reservoir and passes the perfusate through a dialysis filter, oxygenator, and temperature and pressure sensors prior to entering the chamber where an organ is perfused. The organ rests on the platform such that perfusate leaving the organ flows into the perfusate reservoir. The dialysis filter having permeable tubes which allow perfusate constituents to be exchanged with dialysate flowing through the dialysis filter. The dialysate pass through an ion exchange resin removing selected constituents or waste products from the dialysate by absorption by the ion exchange resin. Following waste absorption, the dialysate is recycled to the dialyzer to again remove waste. Removing waste products from the perfusate by dialysis followed by (Continued)

removal of the waste products from the dialysate with the exchange resin, enables dialysate reuse for extended duration.

10 Claims, 5 Drawing Sheets

(56) References Cited

U.S. PATENT DOCUMENTS

| | | | |
|---|---|---|---|
| 9,320,269 B2 | 4/2016 | Brassil | |
| 10,321,676 B2 | 6/2019 | Hassanein et al. | |
| 2003/0089670 A1* | 5/2003 | Saccomanno | B01D 53/007 210/748.11 |
| 2008/0097233 A1* | 4/2008 | Pedersen | A61B 5/14557 600/531 |
| 2010/0316705 A1 | 12/2010 | Brasile | |
| 2011/0076666 A1* | 3/2011 | Brassil | A01N 1/143 435/284.1 |
| 2013/0177989 A1 | 7/2013 | Brassil et al. | |
| 2015/0342177 A1* | 12/2015 | Hassanein | C12M 21/08 435/284.1 |
| 2017/0188571 A1 | 7/2017 | Chapman et al. | |
| 2020/0138015 A1* | 5/2020 | Bagnato | A01N 1/0294 |

OTHER PUBLICATIONS

Biotechnology Letters, Pappy John Rojan, Kesavan Madhavan Nampoothiri, Athira Syamaprasad Nair, and Ashok Pandy, "L(+)-Lactic acid production using Lactobacillus casei in solid-state fermentation", pp. 1685-1688, Aug. 22, 2005.

Nature Biotechnology, Dilmurodjon Eshmuminov, Dustin Becker, Lucia Bautista Borrego, Max Hefti, Martin J. Schuler, Catherine Hagedorn, Xavier Muller, Matteo Mueller, Christopher Onder, Rolf Graf, Achim Weber, Philipp Dutkowski, Philipp Rudolf von Rohr, and Pierre-Alain Clavien, "An integrated perfusion machine preserves injured human livers for 1 week", pp. 189-198, Feb. 2020.

3 Biotech Springer.com, Moumita Bishai, Swarnalok De, Basudam Adhikari, and Rintu Banerjee, "A platform technology of recovery of lactic acid from a fermentation broth of novel substrate Zizyphus oenophlia", pp. 455-463, Aug. 22, 2014.

Journal of Surgical Research, Omar A. Mownah, MRCS; Muhammad A. Khurram, MRCS; Christopher Ray, MRCS; Aditya Kanwar, MRCS; Susan Stamp, HNC; Douglas Rees, PhD; John Brassil, MS; Joaquim Majo, LMS; John H. Dark, FRCS; Noel M. Carter, PhD; and David Talbot, PhD, FRCS; "Development of an ex vivo technique to achieve reanimation of hearts sourced from a porcine donation after circulatory death model", pp. 326-334, Feb. 28, 2014.

* cited by examiner

APPARATUS AND METHOD FOR SUSTAINING AND EVALUATING ISOLATED ORGANS

STATEMENT AS TO RIGHTS TO INVENTIONS MADE UNDER FEDERALLY SPONSORED RESEARCH AND DEVELOPMENT

This invention was made with government support under W81XWH1910743 awarded by (DOD). The government has certain rights in the invention.

CROSS REFERENCES TO RELATED APPLICATIONS

Not applicable.

BACKGROUND OF THE INVENTION

This invention generally relates to organ and vascular composite allograft (VCA) transplantation and medical research, specifically to ways to sustain and evaluate isolated organs to increase transplantation and to discover new medical treatments and progress in physiology research.

BACKGROUND—PRIOR ART

Previously, there is art in the field of isolated organ perfusion for transplantation and other applications. Following is a review of selected patents in the field:

Brassil U.S. Pat. No. 9,320,269 describes a system of organ preservation that incorporates perfusion, sterility, oxygenation, pulsatility, and physical and chemical control of the perfusion process. It does not teach processes for removing unneeded waste products from the perfusate. This patent is incorporated by reference.

Hassanein U.S. Pat. No. 10,321,676 describes systems to measure lactate in perfusate as means of organ evaluation during preservation. It teaches that observed lactate in perfusate is a measure of organ suitability for transplant. It does not teach lactate remediation.

Chapman Patent application 2017/0188571 describes a system to normothermically perfuse organs that incorporates a dialyzer in the perfusion circuit. It does not teach ion exchange nor extend the approach to VCA. In Chapman, the volume of dialysate used is not stated explicitly, although its FIGS. 14a does show a dialysate reservoir and waste container, expectedly each of non-negligible volume.

Brassil Patent application 2013/0177898A1 describes a method for treating organs ex vivo using light, wherein dialysis is disclosed as a means to remove unwanted waste. This application does not teach ion exchange nor application of the method to VCA.

Brasile Patent application 20100316705A1 describes a system for exsanguinous metabolic support including dialysis for removal of waste products. It does not disclose dialysate volume, composition, nor applicability to VCA nor use of ion exchange.

Brassil U.S. Pat. No. 8,741,555 describes a method of using microdialysis to evaluate an organ by placing dialyzing probes onto specific locations on the organ.

Friend U.S. Pat. No. 7,410,474 describes methods and means of extracorporeal organ perfusion that avoids the use of dialysis, and in effect teaches against the use of dialysis.

Minten U.S. Pat. No. 5,716,378 describes a method of preserving hearts at mid-hypothermic temperatures that includes the application of dialysis to the removal of catabolites during preservation. However, it indicates that large volumes of dialysate may be required and specifically teaches against dialysis during portable operation in FIGS. 3, Item 75.

Fleming U.S. Pat. No. 4,666,425 describes a device for perfusing an animal head that includes the use of both dialysis and ion exchange as implements for removing waste products specifically from a perfused head. It does not specify the dialysate, ion exchange resin, the removal of lactate specifically, nor the interactions among these elements to achieve portability in routine clinical organ preservation.

Harmening U.S. Pat. No. 4,112,070 describes a method of preserving blood by direct contact with anion exchange resin that has been pre-charged with metabolically supportive phosphate ions to be released into the blood during storage. The Harmening invention conflicts with teaching by others (Rees EP1164841B1) that inorganic phosphate is known to inhibit glycolysis in culture.

The following further patents apply to the disinfection aspect of the invention applying electromagnetic energy to the perfusate to control and reduce circulating pathogens:

Edblom U.S. Pat. No. 1,683,877 describes an apparatus to treat blood stream infections by the application of ultraviolet (UV) energy to flowing blood. It describes the construction of a device that permits blood to be withdrawn from a person, after which the blood is exposed to UV via a quartz window and subsequently returned to the patient. Described is blood exposure to continuous, broadband UV via a quartz window into a sealed chamber with a tortuous flow path. The Edblom invention describes the foundational aspects of blood irradiation for infection treatment, but it does not apply them to isolated organ perfusion, it relies on a tortuous path irradiation chamber, and it is limited by the irradiation technology of its time; so, it does not anticipate the temporal and spatial energy aspects of modern optoelectronic devices using semiconductors.

Petrie U.S. Pat. No. 6,312,593 describes an apparatus for applying UV irradiation to the blood of an infected patient. It describes a chamber that introduces turbulence into the blood as it flows the radiative field as a means to increase the exposure of the blood to the UV energy, observing that the penetration depth of UV energy into blood is shallow. The focus of this invention is on the labyrinthine blood path connected directly to a patient.

Petrie U.S. Pat. No. 10,596,279 describes an invention for applying UV energy to fluids containing red blood cells, incorporating a bladder into the UV irradiation chamber to enhance the UV exposure of the fluid and its components. This invention does not have the limitation of requiring direct connection to a patient nor requiring single pass irradiation. However, it is not directed toward organ perfusion, and it does require a bladder to spatially modulate the fluid containing red blood cells during irradiation.

SUMMARY OF THE INVENTION

This invention includes a system for removing waste materials from biological fluids occurring within a system of organ perfusion. Vascularized structures are generally perfused during preservation for transplant and also for research purposes, wherein the term perfusion refers to the process of impelling biological fluids such as blood through the vasculature. Vascularized structures include organs, tissues, and composites further including limbs, faces, and extremities. For this application, any of the terms, organ, tissue, composite, limb, face, and extremity should be considered equivalently as referring to all these terms unless specified otherwise.

Perfusion provides vital materials via perfusate flowing through the organ, enabling vital maintenance while the organ is outside the body. However, perfusion also conveys waste products from the organ. As perfusion systems regularly are designed to recirculate the perfusate from and to the organ, a means for waste removal is necessary to prevent the reintroduction of excess built-up waste back into the organ. Considering further that perfusion systems used in organ transplantation often are portable, such portable systems benefit from compact geometry, lightness in weight, and efficiency. A waste removal system for such organ perfusion systems is described herein.

This invention employs dialysis working together with dialysate ion exchange to remove targeted wastes from the perfusate, while potentially replacing those wastes with an alternate beneficial material. Dialysis is an established method for removing metabolic waste from the blood of clinical patients suffering from impaired kidney function. Dialysis has been used comparably in organ perfusion to remove waste from the perfusate. In dialysis, the blood or perfusate flows along a membrane separating it from a flowing dialysate. In dialysis, the flowing perfusate and dialysate seek equilibrium for their dissolved components, within specific size bounds of each component. Although dialysis does remove waste products from perfusate, the high volume of fresh dialysate required to continually remove such wastes precludes easy portability. This invention provides a means to remove specified wastes from the dialysate and transfer them into a resin cartridge using an ion exchange process. Such a system provides a cleaning process for targeted wastes so the dialysate can be recirculated. This recirculation is achieved within a contained, sealed fluidic circuit, enabling portable, aseptic operation in messy transport conditions.

This invention furthermore applies ultraviolet (UV) energy to the perfusate to inactivate pathogens in organ perfusion. Pathogens such as bacteria may become present in the perfusate from sources including from the originally donated blood or organ, and also from the environment, for example from the air during transfer of blood and organ from donor into the perfusion system. As conditions within the system maintain a live-sustaining environment for the preserved organ, for example by maintaining regular body temperature, these conditions likewise potentiate survival and expansion of present pathogens including bacteria. Ultraviolet energy may be applied to the circulating perfusate through a UV-transmissive window applied to the sealed perfusion circuit to reduce pathogenic presence or prevent or eliminate expansion. UV has been shown to inactivate pathogens in flowing blood and red blood cell-containing fluids. Apparatus is described to enable UV disinfection of fluid perfusate within an organ perfusion system including a flow chamber disposed within the perfusion circuit containing a UV emitter and transparent window suitable for irradiating the perfusate. Components are specified, arranged, and controlled to apply regulated UV energy to the perfusate such that pathogens are inactivated while the viability of blood components within the perfusate is maintained.

In one embodiment, the targeted metabolic waste is lactate. Lactate is a byproduct of the metabolic process glycolysis that contributes importantly to production of cellular energy from glucose. Normally lactate is removed from the blood by the liver, where it can be beneficially reconverted to glucose via gluconeogenesis. For preservation of non-liver organs and vascular structures, an alternative means for lactate removal from the perfusate must be provided, Excess cellular lactate impedes glycolysis and impedes glucose metabolism. In a closed perfusion system without dialysis, lactate levels can increase from a normal background level of 2 millimolar to greater than 20 millimolar within 3 to 20 hours. In this embodiment, lactate is removed from the perfusate by dialysis and the lactate is subsequently removed from the dialysate by the ion exchange resin. The removed lactate is replaced by another anion, chloride, which can be dialyzed subsequently into the perfusate and tolerated well by the organ.

Other embodiments employ other resins or multiple resins and employ alternate preconditioning processes to target specific wastes for removal and provide specific solutes to replace them.

Other embodiments employ UV energy applied to the perfusate through a transmissive window to inactivate pathogens therein.

Figure 1:
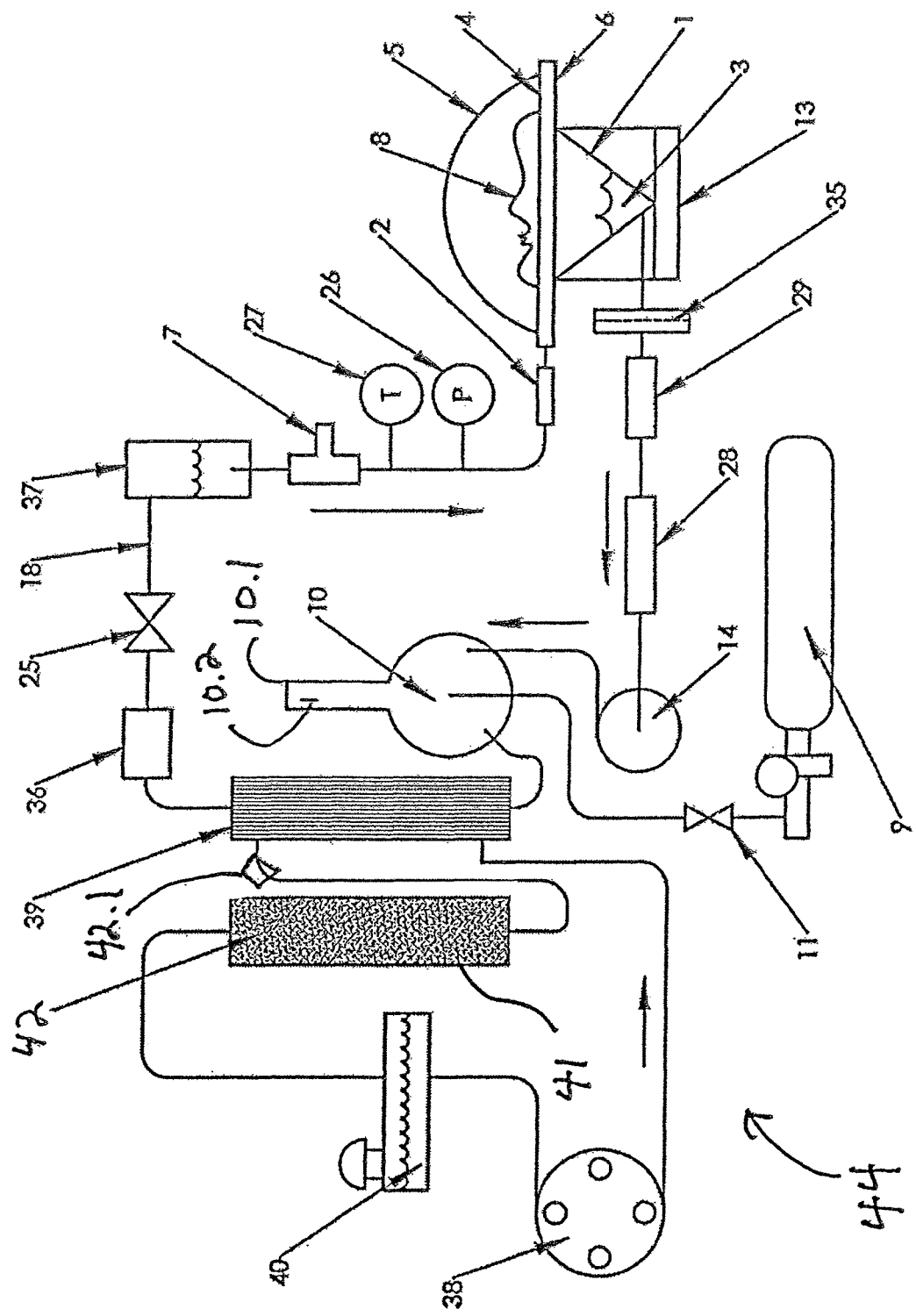
FIG. 1 shows the perfusion flow and components as a schematic diagram.

| DRAWINGS - REFERENCE NUMERALS | | | |
|---|---|---|---|
| 1 | cassette | 2 | cannula |
| 3 | perfusate | 4 | face support |
| 5 | cassette lid | 6 | compressible lid seal |
| 7 | sampling port | 8 | anthropometric support |
| 9 | gas cylinder | 10 | oxygenator |
| 11 | gas control solenoid | 12 | control panel |
| 13 | heater | 14 | pump |
| 15 | CPU | 16 | battery |
| 17 | mains plug | 18 | tubeset |
| 19 | status LEDs | 20 | buttons |
| 21 | display | 22 | handles |
| 23 | insulation | 24 | heated deck |
| 25 | perfusate valves | 26 | pressure sensor |
| 27 | temperature sensor | 28 | oxygenation sensor |
| 29 | disinfector | 30 | battery sensor |
| 31 | lid sensor | 32 | power supply |
| 33 | base enclosure | 34 | enclosure lid |
| 35 | perfusion filter | 36 | flow sensor |
| 37 | bubble trap | 38 | dialysis pump |
| 39 | dialysis filter | 40 | dialysis reservoir |
| 41 | ion exchange cartridge | 42 | resin |
| 43 | housing | 44.1 | lid |
| 45 | control PCB | 46 | UV emitter |
| 47 | UV shield | 48 | O-ring |
| 49 | strain relief | 50 | hose barb |
| 51 | window | 52 | perfusate UV chamber |
| 53 | UV manifold | | |

DETAILED DESCRIPTION OF THE INVENTION

Figure 2:
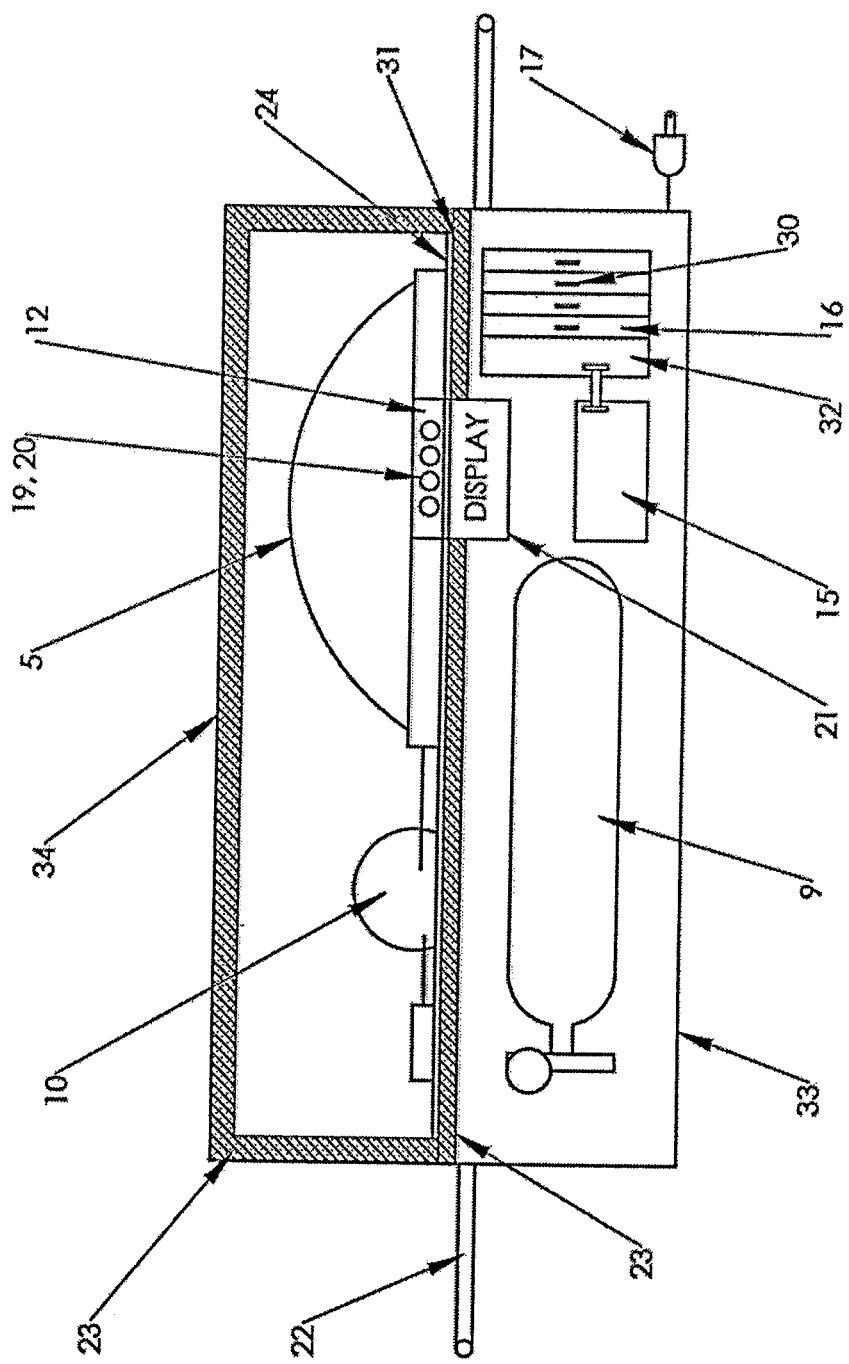
FIG. 2 shows the machine in a portable configuration for face perfusion, drawn as a cutaway view.
Figure 3:
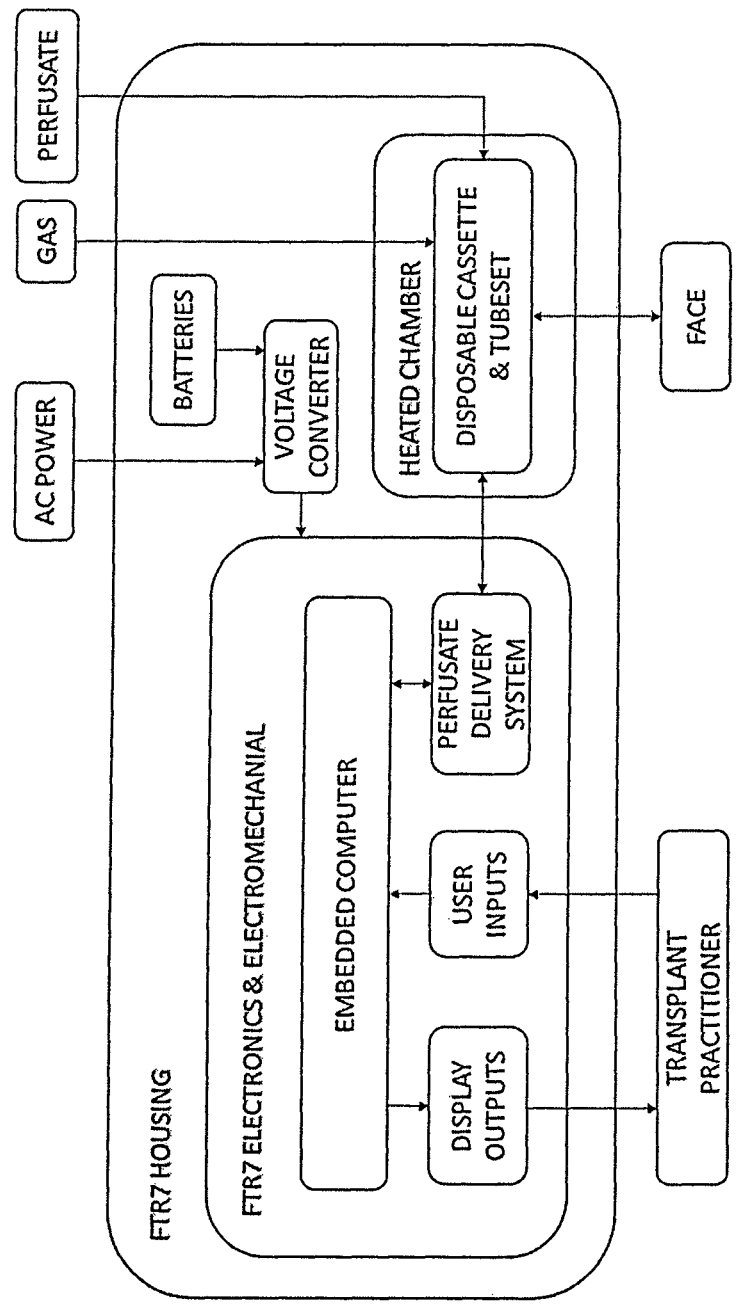
FIG. 3 shows the functional interconnections of the machine as a system diagram.

One embodiment of the perfusion apparatus is shown as a schematic in FIG. 1, and cutaway view and system diagram are shown in FIGS. 2 and 3. In this embodiment, the organ is a face 8. In general, an organ held within a cassette 1, receives a fluid perfusate 3 from a reservoir, moved by a pump 14 through tubeset 18, which delivers the perfusate into the organ's artery. The tubeset 18 can be clipped to the organ baseplate 4 so as to position the tubeset to interface with the face and other components in the face cassettes 1 such a disinfection module energy source permanently connected to the deck 24.

In FIG. 1 the chamber 1 is covered by a lid 5, which is held in place by clips and kept airtight by a seal 6. The configuration of the chamber 1, lid 5, clips, and seal 6 prevents contamination of the organ in the apparatus. Specifically, germ control strategies must be used in applications and embodiments resulting in organ or tissue or cell transplantation after residence in the apparatus, and other applications and embodiments involving long duration residence of organs in the apparatus, for example in normothermic (body temperature) preservation and beyond 24 hours. In embodiments requiring germ control, perfusate-contacting surfaces must withstand sterilization prior to placement of organ and perfusate in the chamber 1, and then must be configured to receive and maintain the organ in a way that entry of germs to the perfusate contacting space is sufficiently limited or prevented. In embodiments, an active disinfection device, disinfector 29 is disposed within the perfusion tubeset to deliver disinfecting energy to the flowing perfusate, which may be for example ultraviolet light energy. Furthermore, perfusate-contacting surfaces must be biocompatible in embodiments used for organs with human clinical uses. A biocompatible surface in this apparatus will non-toxic if placed in direct blood contact for 24 hours, or other similar requirement as set by the Food and Drug Administration or other relevant regulator.

A perfusate 3 as described herein is a fluid or slurry that is directed through the blood vessels of the organ. In embodiments it functions like blood to supply the organ with necessary materials for metabolic support such as oxygen and glucose, and to remove waste products such as carbon dioxide and lactate. It should be appreciated that the function of blood in an organ is complex and multifactor, and perfusate should be understood to encompass any or all of the blood function.

In this sense perfusate may be blood, possibly anti-coagulated with a chemical such as heparin to prevent clotting, possibly from the same donor as the organ to avoid certain types of rejection or inflammation, and possibly of the same species and blood type to avoid further rejection and inflammation.

Perfusate may be also composed as the acellular, or serum component of blood containing water, electrolytes, sugars, and other chemicals relevant to the support of the organ. When perfusing an organ at temperatures near 25 C and below, there is sufficient solubility of oxygen in water to support the organ and so perfusate may safely support organs without red blood cells. Such perfusate may be serum of the same donor, blood type, and species to avoid certain rejection problems.

Perfusate may be instead wholly synthetic, mixed in the laboratory using chemicals that may be pharmaceutical grade chemicals that may be subsequently sterilized. The chemical composition may be very similar to serum and therefore be called extracellular. Examples of extracellular perfusates may include various cell culture media such as Krebs-Ringer's solution (Sigma) or organ preservation media such as RS-I (Aqix®) or Steen Solution™ (Vitrolife). Alternatively, the perfusate chemical composition may be more similar to the cytoplasm, a so-called intracellular solution such as UW® (Bridge to Life). Other organ preservation solutions may be also perfusates including KPS-1® (Organ Recovery Systems), and Perfadex (Vitrolife).

Furthermore, synthetic perfusates may be mixed with natural components such as albumin for oncotic support or washed erythrocytes for oxygen carrying. In other embodiments they may be mixed with artificial components for oxygen carrying, such as perfluorocarbons.

In this first embodiment, the following perfusate composition will be used:
- 45% RS-I extracellular solution (Aqix®, London UK), pH titrated to 7.350.
- 50% Whole blood or washed blood cells, type matched to donor or recipient
- 5% Albumin The present inventor does not intend to restrict perfusate composition to this first embodiment and numerous perfusate compositions are well-known and available for use by persons knowledgeable in the art. Embodiments are disclosed incorporating all such perfusates for application within this present invention.

In this embodiment of the apparatus, perfusate-contacting surfaces are pre-sterilized, which enables them to be used aseptically. Sterilization methods including ethylene oxide gas sterilization and electron beam and gamma radiation sterilization, and also incorporating presterilized disposable components.

The perfusate-contacting components and example materials are provided in Table 1:

TABLE 1

Perfusate-contacting parts in one embodiment:

| Number | Name | Contacting material | Manufacturer |
|---|---|---|---|
| 1 | chamber | polycarbonate plastic | Functional Circulation |
| 2 | cannula | polycarbonate plastic | Functional Circulation |
| 4 | face support | polycarbonate plastic | Functional Circulation |
| 5 | cassette lid | polycarbonate plastic | Functional Circulation |
| 6 | lid seal | silicone | Functional Circulation |
| 7 | sampling port | medical purchased | Qosina |
| 8 | anthro. support | silicone | Functional Circulation |
| 10 | oxygenator | medical purchased | Terumo |
| 14 | pump (head only) | medical purchased | Levitronix |
| 18 | tubeset | pvc plastic | Functional Circulation |
| 26 | pressure sensor | medical purchased | PendoTech |
| 27 | temperature sensor | medical purchased | PendoTech |
| 28 | gas sensor | medical purchased | preSens |
| 29 | disinfector | quartz, PVDF plastic | Functional Circulation |

TABLE 1-continued

Perfusate-contacting parts in one embodiment:

| Number | Name | Contacting material | Manufacturer |
|---|---|---|---|
| 36 | flow sensor | medical purchased | Sensirion |
| 37 | bubble trap | polycarbonate plastic | Functional Circulation |
| 39 | dialysis filter | polysulfone | Fresenius |
| 40 | dialysis reservoir | polycarbonate plastic | Functional Circulation |
| 41 | ion exchange | acrylic resin | Functional Circulation |
| 48 | O-ring | silicone | McMaster |
| 51 | window | quartz | Functional Circulation |
| 53 | UV manifold | polycarbonate plastic | Functional Circulation |

In this embodiment, Table 1 parts are biocompatible on surfaces that contact the organ or perfusate. Furthermore, Table 1 parts are presterilized and provided for use in a pre-sterilized, sealed package. It can be appreciated that other materials to serve the functions of the Table 1 components, including ones that are autoclave sterilizable should be considered as alternate embodiments and within the scope of this invention.

In FIG. 1, perfusate 3 in reservoir 1 is heated by heater 13 before being impelled by pump 14 through tubeset 18 into the organ 8 vasculature via cannula 2, from which effluent perfusate returns to reservoir 1 forming a continuous perfusion circuit. Items within the circuit within which perfusate is conveyed include filter 35, disinfector 29, gas sensor 28, oxygenator 10, dialysis filter 39, flow sensor 36, pinch valve 25, bubble trap 37, sampling port 7, temperature sensor 27, and pressure sensor 26, which pressure sensor is disposed in proximity to the organ to minimize pressure drop error introducible by intervening items.

Notable among these items, dialyzing filter 39 is a component within the described perfusate fluidic path and is furthermore a component within the dialysate fluidic path, which paths are separated within the dialyzer filter by a membrane. This dialysis membrane presents a means of separation between the two fluid paths, perfusate and dialysate, preventing transport for larger molecules or those outside a specified size, or possessing other known chemical characteristics. Otherwise, smaller or certain specific molecules are enabled within the dialyzing filter to transfer between the fluid paths at quantities and rates that are influenced by charge, pressure, and concentration gradients.

It is appreciated that selection of dialysis filter material, size, and geometry, associated with the fluids' chemical compositions and pressures presents a variety of opportunity to remove and add specific components from and to the perfusate. In this first embodiment, the anion lactate is removed by dialysis from the perfusate and replaced with the anion chloride. Alternate embodiments enable other replacements as would be understood by those skilled in the art.

Embodiments are disclosed wherein perfusate effluent does not recirculate but is instead conveyed through the organ vasculature in a single pass perfusion mode. Further alternate embodiments employ both recirculation partial recirculation and single pass modes controlled to occur in sequence. Thus, the perfusate maybe single pass mode while the cassette 1 is not being transported and recirculation when the cassette 1 is being transported. Allowing only a portion of the perfusate to recirculation while a smaller portion is removed with each recirculation pass limiting the buildup of waste products which cannot be removed by dialysis or ion exchange.

A dialysis flow path is likewise in fluidic communication with dialysate filter 39. Dialysate stored in dialysis reservoir 40 is impelled by pump 38 into the dialysate compartment of dialysis filter 39, dialysis pressure sensor, and ion exchange cartridge 41. In this dialysis flow path, dialysate is subjected to a process of ion exchange in the ion exchange cartridge 41, wherein a resident ion exchange resin 42 captures specified solute ions, replacing them with specified and potentially different ions.

In the first embodiment, the ion exchange resin is a weak base anion exchange resin that is preconditioned to capture lactate ions from the dialysate replacing them with chloride anions. In this first embodiment, the process of dialysate ion exchange at the ion exchange cartridge has the effect causing lactate in the perfusate to be replaced by chloride at the dialysis filter. Embodiments employing other resins such as cation resins would exchange other cations. Embodiments employing preconditioning with carbonic acid rather than hydrochloric acid would replace lactate with the carbonate anion rather than chloride. Embodiments employing multiple resins would replace multiple, specific solute species. The present invention is not limited by these examples. Dialysate solution typically contains six (6) electrolytes: sodium (Na+), potassium (K+), calcium (Ca2+), magnesium (Mg2+), chloride (Cl—), and bicarbonate. A seventh component, nonelectrolyte glucose or dextrose, is typically present in the dialysate.

Embodiments wherein the dialysate does not recirculate but rather transits the dialysate flow path once or a limited number of times are also hereby disclosed.

FIG. 1 components adjunctive to the dialysate and perfusate paths include compressed gas tank 9, gas control valve 11, anthropomorphic organ support 8, cassette lid 5, organ baseplate 4, and lid seal 6. The gas tank is first embodied as a single tank of compressed medical oxygen; although other gases or gas mixtures spanning one or more tanks are hereby disclosed. Furthermore, embodiments incorporating environmental air are disclosed as be pumped and incorporated into the flowing gas path. These gases are conveyed into oxygenator 10 wherein they are transported for solution into the perfusate primarily as reactants for cellular respiration. The oxygenator 10 has a gas exhaust 10.1 and least one gas concentration sensor 10.2 disposed in the gas exhaust. The gas concentration sensor 10.2 is connected to the display 21 as shown in FIG. 2 and can be connected by a data communication link to the CPU which then supplies the output of the gas concentration sensor to the display.

FIG. 2 is a cutaway view of the organ perfusion system configured as a portable system. Base enclosure 33 provides a support and enclosure structure for the perfusion circuit, dialysis circuit, and gas supply. Insulation 23 surrounds the space containing the organ and perfusate to limit heat transfer and improve the temperature control around organ and perfusate, wherein heat is provided by the heated deck 24.

An enclosure lid 34 enables access to the organ and perfusate for placement and removal. In embodiments, the perfusate circuit and dialysate circuit are pre-sterilized and remain sealed while in use, such that the enclosure lid may be opened without sterility threat to the organ or perfusate. This enables placement and removal of lid 34, further enabling controllable access for visual observation, perfusate sampling, and operator control via buttons 20 and status LEDs 19. The lid sensor 31 provides feedback to the control system that the lid is properly in place. The system is controlled by a CPU 15 which is powered by a power supply 32 supplied by the mains plug 17 or powered by the battery 16 which charge status is observed by the battery sensor 30. The portable system is lifted and carried by the handles 22.

FIG. 3 shows the functional interconnections of the machine as a system diagram.

Figure 4:
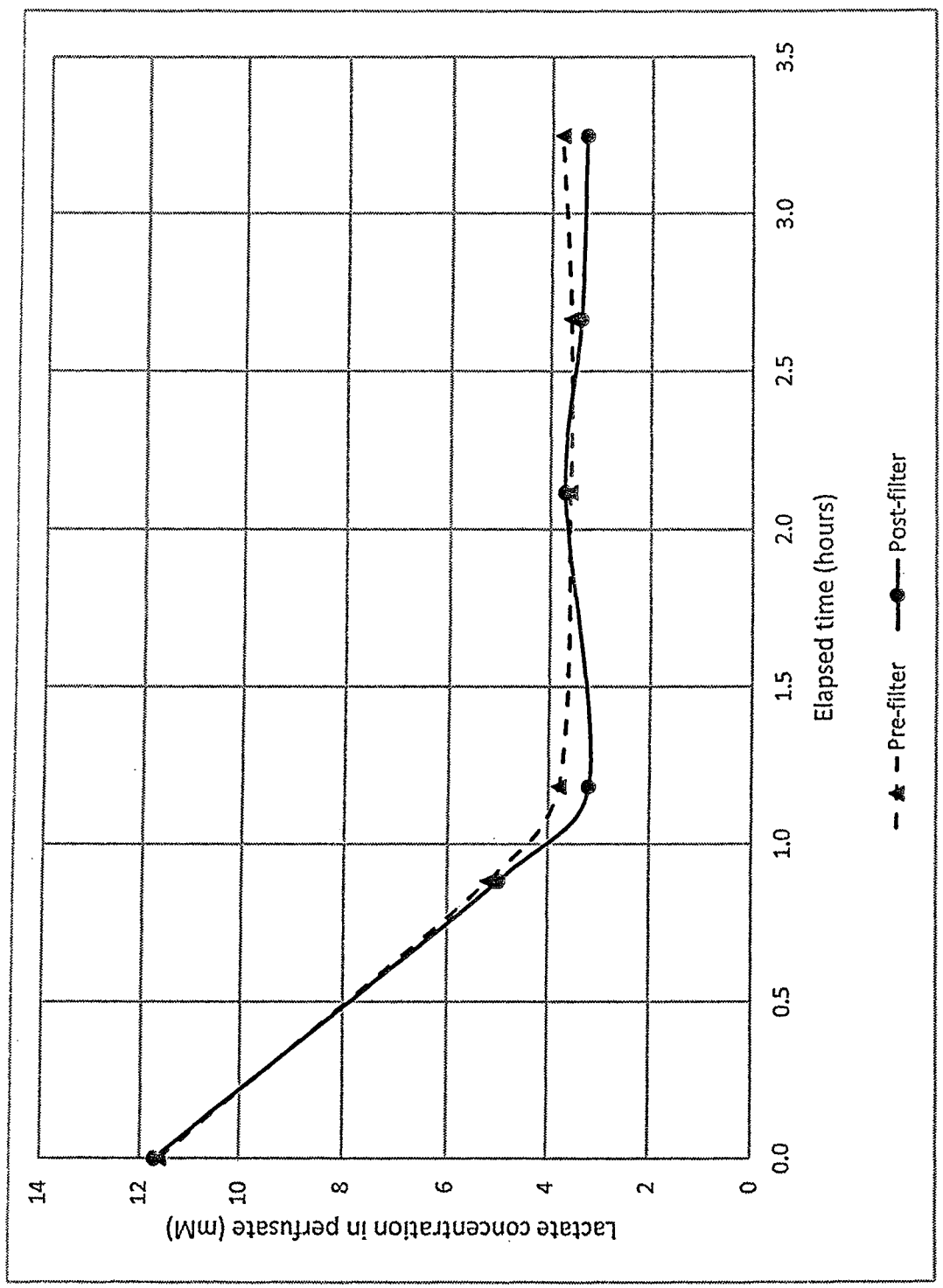
FIG. 4 shows a graph of the lactate response to the one embodiment.

FIG. 4 is a graph of lactate concentration response during the evaluation.

Figure 5:
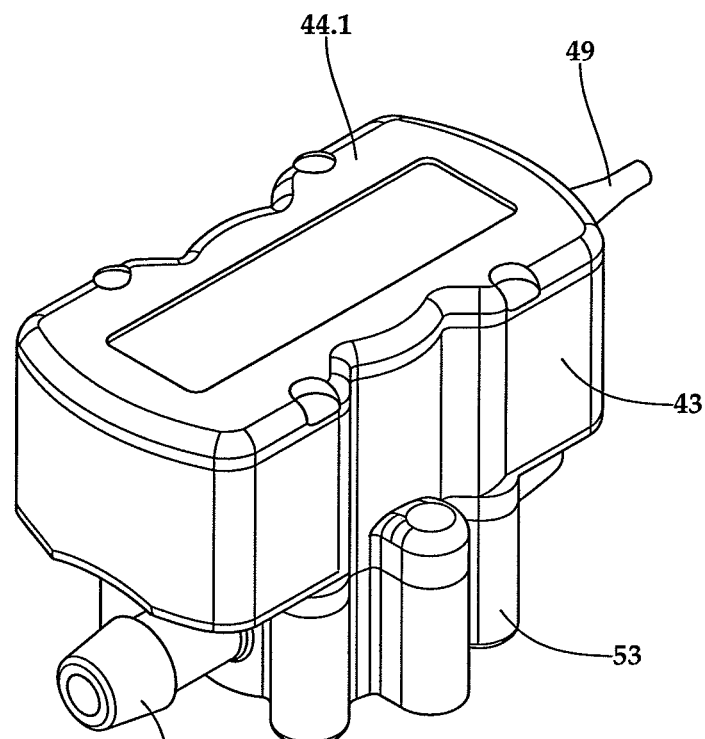
FIG. 5 shows the disinfection module drawn as perspective.
Figure 5A:
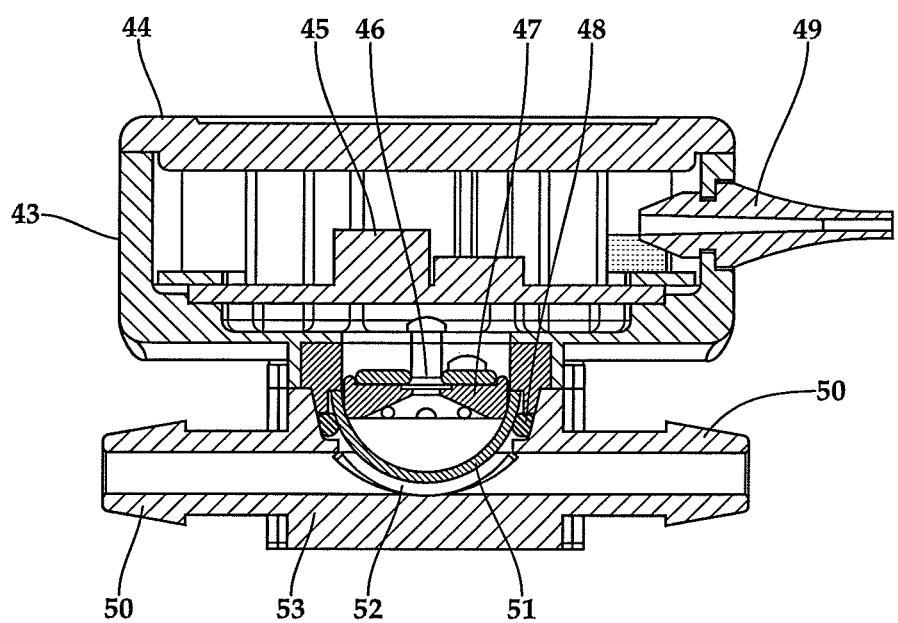
FIG. 5A shows the disinfection module as a cutaway view.

FIGS. 5 and 5A. shows the disinfection module, which comprises a non-sterilized sub-module containing the control and optoelectronic components, and a sterilized sub-module containing the perfusate manifold and UV-transmissive window. The non-sterilized sub-module consists of housing 43 and lid 44.1 containing control PCB 45 and strain relief 45. The UV emitter 46 contained therein is electrically connected to control PCB 45 and oriented to direct UV emissions toward the UV manifold 53. The sterilized sub-module consists of the UV manifold 53 which comprises the perfusate UV chamber 52 and hose barbs 50 and contains window 51 and O-ring 48 as a sealed assembly through which perfusate flows. The sterilized and non-sterilized modules are fitted with features that enable their assembly into a single unit for perfusion, to become separable thereafter, such that the non-sterilized module may remain connected to the greater system, while the sterilized module may be removed for disposal or re-sterilization. Interfacing features between housing 43 and UV manifold 53 are provided for directed UV emissions from UV emitter 46 toward perfusate UV chamber 52. Interlocking features between housing 43 and UV manifold 53 are furthermore disclosed including lap joints to prevent UV leakage outside the disinfection module, and control features such as hall sensor and magnet to deenergize UV emissions when modules are separated.

Reference is made to FIG. 3 that provides a logical overview of the system. Briefly, a clinician user interacts physically and through a user interface with a portable system that perfuses a face between recovery from donor and recipient. By perfusing the face, the possibility for successful transplant with reduced rejection is enhanced. Embodied as a transporter for human faces, these terms transporter and face are not intended to be restrictive and are interpretable to incorporate perfusion systems portable and stationary for the range of vascular structures including organs, tissues, and composites of the forgoing.

The system applies normothermic perfusion to explanted faces for transplant. It is a portable system designed to be carried by 2 people and transported by a highway or other vehicle from explant to the transplant hospital. The system is managed in transit by trained medical personnel, who monitor the system directly and by telemetry, and who make adjustments if required. The system is self-contained and automatic, requiring minimal re-adjustment during transport; however, technicians accompany it to address potential and unexpected eventualities. The perfused face is contained within a pre-sterilized, sealed cassette 1 while on the system. Transplant physicians assisted by surgically-trained nurses and technicians perform the aseptic transfer of the face into the system at the explant site and out of the system at the transplant site, assuring the cassette is sealed during transport. At the time of placing the face into the cassette, the physician inserts and secures a sized cannula 2 into the carotid artery and seals it there to prevent leaks. It is through this cannula that the face is perfused.

The perfusate 3 is a pharmacy-mixed preparation comprising type-matched red blood cells, electrolyte solution, and albumin, plus medicines for anticoagulation, vasodilation, acid-base buffering, metabolic control, and steroids, plus possible nutritional additives as described in the literature. It is maintained at body temperature and oxygenated to enable normal metabolic activity for each of four tissue types: skin, muscle, bone, and nerves. Operation at other temperatures, particularly those below body temperature are furthermore accommodated. Perfusate is purchased pre-mixed or mixed aseptically by the pharmacy and provided to the transplant team at the time of departure to explant. During system setup at the explant site, perfusate is decanted aseptically into the cassette and recirculated to warm it body temperature. During this warm-up, the system is preferably plugged-in to wall power to preserve the batteries for transport use.

The single-use disposable tubeset 18 is a presterilized assembly that functions with the face contains and provides perfusate within the cassette, the tubeset includes the tubing and sensors to enable perfusion within a sealed, aseptic environment. The following functions occur within the tubeset: pumping, oxygenation, disinfection, filtering, dialysis, and measurement of pressure, temperature, and oxygenation. The disposable tubeset is a pre-assembled and forms a sealable system of tubing-connected components including the face-holding cassette. The cassette serves as both the supporting container for the face and the reservoir for the perfusate. Perfusate flows into the carotid artery through the cannula and exits the face through the jugular veins, flowing into a reservoir volume below the face support. A clear, removable lid 5 covers the cassette and seals onto a compressible surface 6 around an outer rim, held in place by repositionable clips. Once the lid is in secured, the disposable set is a fully-enclosed circuit that is microbiologically isolated from the environment. The lid should remain closed, and the circuit sealed from explant to transplant. Sealing of the perfusion circuit and disinfection by disinfector 29 will prevent and inhibit pathogenic infection during perfusion. For perfusate sampling, one or more sampling ports 7 are provided to enable biochemical analysis. A custom-fitted, anthropomorphic face support 8 may be incorporated onto the basic support surface to enable maintenance of proper face form and shape during transport.

Gas 9 for metabolic support is incorporated onto the system and connected by tubing to the oxygenator 10 component of the single use tubeset 18. The gas is medical oxygen, possibly mixed with nitrogen, carbon dioxide or both. Environmental air may also be used as an oxygenating gas, which would require an integrated pump to provide the necessary flow. A space for securing a portable tank with regulator is incorporated onto the system to provide gas of sufficient type, volume, pressure, and flow. A control solenoid 11 on the system provides pulsed flow gas regulation and shut-off.

Users have available start-stop and setup controls 12 on the automatic system. The system is controlled by the user using five momentary switches 20: POWER, WARMUP, PRIME, PERFUSE, and STOP. The POWER switch toggles the power to the system. When the POWER button is toggled off, heaters 13 and the pumps 14 are switched off and the CPU 15 maintains a low power sleep mode if power is available from battery 16 or mains power 17. The WARMUP button toggles to start the heaters 13. The user is warned that the system should be plugged-in during warmup. The PRIME button toggles to start and stop the pump 15 to prime the tubeset 18 with perfusate 3 to prepare for perfusion. If the system has not yet warmed-up, the PRIME button also initiates the function of the WARMUP button, i.e., starting the heaters. The PERFUSE button toggles to stop and start regulated perfusion. PERFUSE button starts perfusion when a READY condition is obtained. The READY condition is obtained when all conditions for perfusion are met, including warmup complete, prime complete, and tubeset elements in place. STOP button toggles to stops the pump without turning off the heaters. Status LEDs 19 show the on-off state of each button.

Although user control of the system is via the buttons, the operating dynamics of the system are handled by the CPU 15. Additional operating parameters and limits are configured in an on-system, nonvolatile file that is revisable remotely via privileged administrators. Configuration of the system is allowed only when STOP button has stopped the pump without turning off the heaters. Configurable parameters include high and low limits for pressure, temperature, flow, and oxygen saturation. Pumps 14, heaters 13, and gas flow valves 11 operate to maintain the system within these bounds. Configuration also includes operating limits for pump speed, pump pulsatility (pulse rate and systolic: diastolic ratio) heater current, and gas valve duty cycle. Errant operation outside these limits is annunciated by tones and display messages 21.

Data from the system, including current and historical operation and sensor status are stored onboard for future download and streamed via cellular link to a cloud-connected service. From this service, cell phone applications securely access the data to provide complete perfusion status to the transplant team.

The physical system comprises a base 33 with carrying handles 22 that contains insulation 23 and the system componentry (pumps, batteries, electronics, gas cylinder). The upper surface of the base 33 is the heated deck 24 into which the disposable tubeset 18 is fitted for each perfusion case. The deck has built-in channels and pockets mating to the tubeset components to guide the proper fitment between base and tubeset. An attached, latched, and insulated lid 34 covers the base and keeps the heat inside. During warmup, priming, loading and unloading, the lid is opened to reveal access to the cassette 1 and tubeset 18. At other times, the lid is kept closed. Controls for the system are located under the lid to prevent inadvertent activation of unwanted functions during transport. Displays 21 are visible above and beneath the lid.

Transplant teams use the system to preserve human faces for transplant. Improvements in preservation as provided by perfusion would expectedly lead to extended safe transport and reduced inflammatory response on transplant. These effects would potentiate reduced rejection and improved neuromuscular function of the face. Preserving the face in the near-normal condition of blood-based perfusate and normal body temperature has shown effectiveness in vital organ preservation, including liver and lungs, that the system intends to apply advantageously to the face.

The summary protocol for operating the system is as follows:

Provision the transporter with oxygenation gas and charged-up batteries.
Take the transporter to the donor location and warmup the heaters.
Place the sealed cassette and tubeset into the transporter.
Open the cassette lid, introduce perfusate into the cassette and turn on the gas.
Open the dialysate reservoir and introduce dialysate therein.
Prime the tubeset with the introduced perfusate.
Remove the face from the donor.
Flush the blood from the face.
Place the cannula(s) into the carotid artery or arteries.
Place the face into the cassette in the transporter.
Connect the cannula(s) to the cassette tubeset avoiding bubble introduction.
Perfuse the face while operating the dialysis components.
Seal the lid onto the cassette and close the transporter lid.
Monitor the transporter during perfusion including transport to recipient.
Inspect the face at the transplant operating room.
Open the cassette lid and remove the face.
Transplant the face.
Perform and monitor recipient recovery.
Dispose consumable parts and reprovision transporter for next use.

The following sections explain the system componentry and function in additional detail. The system presents an architecture comprising the following subsystems:

Main system unit enclosure
Single use tubing set
Perfusate
Accessory gases and connections These subsystems are described following in additional detail:

Main System and Enclosure:
  Pump 14: an isolated impeller pump (centrifugal or peristaltic) provides the motive power for perfusion. The timing and speed of pump pulsing are managed by the CPU to control pressure, flow, and pulsatility.
  Heaters 13: cartridge heaters in the enclosure deck maintain the tubeset and cassette environment at body temperature.
  Valves 25: solenoid valves under CPU control direct the perfusate flow during prime and perfuse functions. A pulsed gas shutoff valve 11 regulates gas flow.
  Connections: Inputs from the tubeset sensors and activators are transmitted to the CPU for analysis to assess and control perfusion. The sensors include pressure sensor 26, temperature sensor 27, oxygen saturation sensor 28. The activator includes a disinfection module 29 disposed within the perfusate flow.
  Case internal sensors: battery status sensors 30 and lid sensor 31 provide status on the charge state of each battery, whether the system is plugged-in to mains power, and whether the lid is closed.
  Control electronics: a CPU 15 running firmware provides control signals to the pumps 14, heaters 13 and valves 11, 25, provides data signals to the displays 21, accepts input from the switches and sensors 26, 27, 28, and transceives data to and from the cloud service.
  Power: DC power is provided by a power supply 32 when the system is plugged-in, and by batteries 16 when the system is not plugged-in. The batteries are charged automatically whenever the system is plugged-in.

Enclosure 33: A lightweight, rugged enclosure with handles contains the system components. It is sized for carriage by 2 people and placement into an SUV or van. It has exterior features for gas bottle attachment, mains power cord, and battery access. Its uppermost surface comprises a heated deck 24 onto which the cassette and tubeset may be placed. Insulation within the enclosure minimizes the power required to maintain temperature.

Lid 34: An insulated, latched lid is attached to the enclosure above the deck to maintain the perfusion temperature and to protect the face and perfusion process. The lid is opened by the transplant team at explant and transplant to place and remove the face from the system.

Single Use Tubing Set:

Cassette 1: The cassette contains and supports the face during perfusion and provides a perfusate reservoir beneath the face. The uppermost aspect of the cassette is a ring-shaped platform ledge, topped by an elastomeric seal and retention features to attach and seal the lid. The upper volume of the cassette above the sealing ring is a domed volume where the face is contained. Immediately below the face is a support surface that may include anthropomorphic features to control the shape and form of the face and contains a net or film to attached to the support surface and extends over the face and again attached to the support surface to serve as a "seat belt" for restraining the face against the support anthropomorphic features of the support surface. Below the support surface is the perfusate reservoir incorporating the following features: a drip ramp or channel to prevent drips from creating foam by falling directly from the support surface onto the perfusate surface, a conical reservoir internal base with bottom drain to prevent blood cell settling and to enable complete perfusate recirculation. The cassette is injection molded thermoplastic.

Cassette lid 5: The lid is a clear plastic cover that seals to the cassette and retains the face and perfusate within. The upper aspect of the transparent lid is sufficiently polished to enable visualization of the face inside to assess maintenance of cannulation, uniformity of perfusion and degree of edema. The lower aspect of the lid interfaces with the seal of the cassette to consequentially provide an airtight enclosure. Clips on the lid maintain the lid engagement to the cassette. A handle or finger-grip feature (not shown) on the lid facilitates placement and removal.

Disinfection module 29: This is a powered module adjoining or incorporated in the fluid path that disinfects flowing perfusate 3 by applying energy to it, such as ultraviolet (UV). In embodiments, the disinfection module may comprise sub-modules, one of which contains the opto-electronics and the other module containing the window 51, UV manifold 53, and fluid passages. Such separable optoelectronic and fluidic sub-modules would be interfaced such that UV energy may travel from emitter in the first sub-module and through the window and onto the perfusate in the second. In embodiments the optoelectronic sub-module would not be sterilized, and the separate fluidic sub-module would be sterilized, following which the sub-modules would be joined for use. As UV energy can be an eye hazard, UV emission would be prevented whenever the optoelectronic module disengages from the fluidics sub-module using an interlock such as hall sensor. In embodiments the optoelectronic sub-module consists of the control PCB 45 contained within the housing 43 and lid 44.1. The UV emitter 46 therein is electrically connected to the PCB 45 and fastened to the housing 43 via a UV shield 47, which positions and protects the UV emitter 46, and spatially blocks stray emitted UV radiation. Such an optoelectronic sub-module would be aligned by interfacing features and attached to the fluidic sub-module such that its emitted UV radiation would pass through the UV-transparent window 51 before impinging upon the perfusate 3 within the perfusate UV chamber 52. Transparent window 51 is sealed to UV manifold 53 via O-ring 48 or other suitable seal. In embodiments, the UV emitter 46 is aligned to a location approximating the geometric center of a hemispheric window 51, enabling the radial UV emissions ray pattern to impinge the hemispheric window normal to its window surface to reduce refractive losses. By reducing the refractive losses, UV energy is efficiently applied to the perfusate and unwanted heating due to refracted UV rays is likewise reduced. In operation, perfusate 3 enters the UV manifold 53 through hose barb 50 and from there flows through an internal passageway to perfusate UV chamber 52 where it receives UV radiation from UV emitter 46. Following irradiation, perfusate 3 continues to flow through an outlet passage and exiting hose barb 50, thereby returning to the perfusion circuit tubing 18.

Pressure sensor 26: A disposable, medical arterial pressure sensor is disposed into the perfusate flow, placed immediately before the perfusate enters the cassette. It provides a calibrated measurement of arterial perfusate pressure. A Wheatstone bridge type strain gage within the pressure sensor signals the CPU via a trans-deck connection cable.

Temperature sensor 27: A disposable, medical temperature sensor is disposed in the perfusate flow immediately before the pressure sensor to measure the pre-arterial perfusate temperature. A connector and cable convey the RTD temperature sensor signal to the CPU.

Oxygenator 10: A disposable, medical, hollow fiber membrane oxygenator sized for infant cardiopulmonary bypass provides metabolic oxygen to the perfusate and removes carbon dioxide. The oxygenator is disposed between the pump and the pressure sensor to operate above atmospheric pressure, but about the same or slightly less than as the perfusate pressure to preventing gas phase breakthrough into the perfusate. Its gas tubing is connected to the gas cylinder with interposed solenoid valve and regulator.

Oxygen saturation sensor 28: A module containing a pulse oximeter interfaces to a perfusate-contacting disposable tube assembly. These interfaced parts measure the oxygen saturation of the perfusate upstream of the oxygenator and provide a proportional signal to the CPU. The electronic and sensor elements of this sensor may be disposable or reusable.

Perfusion pump motive element 14: The disposable, motive element of the pump is interposed into the tubeset to draw from the cassette reservoir and deliver the perfusate through the oxygenator and sensors as flow, pressure, temperature, and oxygen-regulated into the artery. If the pump is peristaltic, then the motive element is a properly-sized length of peristaltic pump tubing. If the pump is magnetically-coupled centrifugal pump, then the motive element is a magnetically-coupled impeller.

Perfusate filter 35: A disposable blood filter is interposed between reservoir and pump to remove debris, clots, and large white blood cells.

Flow sensor 36: A disposable flow sensor is placed in the perfusate circuit and provides flow rate signals to the CPU. The flow sensor is a mass flow sensor of the heat transfer type.

Needleless port 7: At least one needleless port is disposed in the tubing set to enable perfusate sampling and introduction of additives to the perfusate.

Tubing 18: The components of the perfusion circuit are connected by sealed-in-place, biocompatible tubing to contain the perfusate during recirculation.

Bubble trap 37: A bubble trap in the arterial part of the tubeset filters gas in the perfusate to prevent its introduction into the face.

Dialysis pump 38: A peristaltic pump provides motive force to the dialysate via a length of peristaltic pump tubing.

Dialysis pressure sensor 42.1: A pressure sensor of similar type as the perfusate pressure sensor, is interposed into the dialysate circuit immediately after the dialysis filter whose pressure measurement is analyzed alongside the perfusate pressure to estimate transmembrane pressure and control the fluid balance between dialysis and perfusion circuits.

Dialysis module 44: A dialyzing filter or membrane 39 is incorporated at the intersection of the perfusion and dialysis fluidic circuits to enable the aseptic transport of metabolic waste products from the perfusate into the dialysate. The dialysis filter may be of high flux or low flux type. Dialysate exiting the dialyzing filter may be subsequently subjected to an absorbent or reactive module 41 or ion exchange column to remove the waste products from the dialysate, thereby allowing the dialysate to recirculate, which would reduce the total required dialysate volume.

Dialysis reservoir 40: A reservoir bottle, up to 1 liter volume, stores and supplies the dialysate to the dialysis circuit. The supplied dialysate is an electrolyte solution approximating the electrolytes in the perfusate. Such a dialysate having a similar chemical content as the perfusate stably maintains perfusate constituents by presenting concentration gradients opposing perfusate changes that would be driven by substrate consumption and waste product production from the perfused face.

Assembly, packaging, sterilization: Tubeset components are assembled, sealed, and packaged for in-package sterilization. Packaged tubeset is openable at the explant site and assembled into the system, maintaining aseptic conditions within its internal aspect. Using aseptic, surgical technique the face and perfusate may be introduced through the lid of the cassette and then the resealed for transportation.

Perfusate 3: The perfusate comprises type-matched red blood cells, electrolytes, albumin, and medicines. It is prepared at the pharmacy, bottled, and delivered to the explant site for introduction into the tubeset before perfusion.

Accessory gases and connections 9: Oxygen-containing compressed gas cylinders are mechanically attached to the main system base to provide metabolically supporting gas to the perfusate via the oxygenator 10. A flow controlling regulator and CPU-controlled solenoid regulates the gas flow to prevent over pressure gas so that gas bubbles are not introduced in to the perfusate being oxygenated which flows through the tube set 18 and into the face support system via the tubeset.

Evaluation of the embodiment involving lactate removal: Tests were performed to observe performance of removal of lactate from perfusate. Observations were additionally made on the maintenance of perfusate chemistry. A perfusion system of the type of FIG. 1 was adapted to perform the test. The following Table 2 lists the major constructional components comprised the test system:

TABLE 2

Major constructional components, lactate removal test:

| Item | Name | Manufacturer | Part Number |
|---|---|---|---|
| 1 | Cassette | Nalgene | 342040-1000 |
| 7 | Needleless sampling port | Value Plastics | FCHPFFMR-003 |
| 10 | Oxygenator | Medtronic | Trillium Affinity NT |
| 14 | Pump | Functional Circulation | G35-1501 |
| 26 | Pressure sensor | PendoTech | PREPS-N-000 |
| 27 | Temperature sensor | Omega | RTD-NPT-72-E |
| 36 | Flow sensor | Functional Circulation | G30-0014 |
| 38 | Dialysis pump | Watson Marlow | 505U |
| 39 | Dialysis filter | Fresenius Optiflux | F18NR |
| 40 | Dialysis reservoir | Nalgene | 342040-1000 |
| 42 | Ion exchange resin | Sigma Aldrich Amberlite | IRA-67 |

The perfusate is a mixture of 50% abattoir-collected, heparinized porcine blood and 50% electrolyte solution totaling 750 mL perfusate. The electrolyte component is made of one bottle of premixed Krebs Ringers buffer (Sigma Aldrich K 4002-1 L), 3.78 grams sodium bicarbonate, and distilled water for each liter made. The dialysate is 750 mL of electrolyte solution, the same composition as used for the electrolyte portion of the perfusate. Both perfusate and dialysate are kept refrigerated until used in the experiment. Table 3 provides the composition of the electrolyte solution used for both perfusate and dialysate:

TABLE 3

Electrolyte solution composition:

| Cations: | |
|---|---|
| Sodium | 136.9 mM |
| Potassium | 4.6 mM |
| Magnesium | 0.5 mM |
| Calcium | 1.2 mM |
| Anions: | |
| Chloride | 127.7 mM |
| Phosphate | 2.1 mM |
| Bicarbonate | 15.0 mM |
| Glucose | 10.0 mM |

The perfusate and dialysate are circulated by dedicated pumps. A nozzle is disposed in the perfusate flow circuit at the location that the perfusate returns to the reservoir to simulate the flow resistance effected by an organ or vascularized tissue. A nozzle is placed in the dialysis circuit to effect comparable transmembrane pressure in the dialysis filter to limit the water volume transport between perfusate and dialysate circuits. The evaluation conditions for perfusate and dialysate are based on expected conditions of organ and tissue preservation:

Perfusate temperature: 27-30° C.
Perfusate flow rate: 43-69 mL/minute

Perfusate pressure: 31-81 mmHg
Perfusate nozzle diameter: 0.024 inch
Dialysate temperature: 32-35° C.
Dialysate flow rate: 28-42 mL/minute
Dialysate pressure: 36-60 mmHg
Dialysate nozzle diameter: 0.024 inch
Dialysate pH: 7.7 (at start and ending timepoints)
Oxygen flow rate: 1 liter/minute
Ion exchange resin mass: 137 grams (dry as supplied)
Ion exchange preconditioning: Chloride version Summary of evaluation results: The perfusion and dialysis fluidic circuits were operated together according to the conditions. Lactate in perfusate was measured using the Nova Biomedical Lactate Plus handheld meter, initially and at intervals of 56 minutes or less. Lactate was sampled for measurement from the perfusate both upstream and downstream of the dialysis filter and ion exchanger set. As the blood component had been abattoir-procured, the perfusate initially contained super-physiologic levels of lactate (11.7 millimolar); so exogenous lactate was not added. The lactate concentrations measured pre- and post-dialysis filter are tabulated below as millimolar (mM) and are provided as a graph in FIG. 6. These data in Table 4 show a 3-fold reduction of lactate in perfusate within 3.3 hours:

TABLE 4

Perfusate lactate concentration (see also graph at FIG. 4):

| Elapsed time (hours) | Perfusate Lactate | |
|---|---|---|
| | Pre-filter (mM) | Post-filter (mM) |
| 0.0 | 11.6 | 11.7 |
| 0.9 | 5.2 | 5.0 |
| 1.2 | 3.8 | 3.2 |
| 2.1 | 3.6 | 3.7 |
| 2.7 | 3.6 | 3.4 |
| 3.3 | 3.8 | 3.3 |

Biochemical analysis, Table 5, was performed on the perfusate at timepoints to evaluate possible constitutional changes to perfusate due to interaction of the dialysate:

TABLE 5

Perfusate biochemical analysis:

| Analyte | Units | Initial | Final |
|---|---|---|---|
| Sodium | mEq/L | 138 | 149 |
| Potassium | mEq/L | 6.6 | 6.2 |
| Chloride | mEq/L | 115 | 135 |
| Bicarbonate | mEq/L | 23 | 11 |
| Calcium | mg/dL | 6.9 | 10.2 |
| Phosphorous | mg/dL | 6 | 2.7 |
| Magnesium | mg/dL | 0.93 | 1.23 |
| BUN | mg/dL | 4 | 3 |
| Creatinine | mg/dL | 0.4 | 0.4 |
| Glucose | mg/dL | 137 | 135 |
| Total protein | mg/dL | 2.9 | 3.3 |
| Albumin | mg/dL | 1.7 | 1.9 |
| AST | IU/L | 103 | 117 |
| Creatine kinase | IU/L | 1100 | 1355 |
| Alk Phos | IU/L | 20 | 33 |
| GGT | IU/L | 55 | 50 |
| Total bilirubin | mg/dL | 1.14 | 0.84 |
| Anion gap | | 7 | 9 |
| Lipemic indice | | 20 | 20 |
| Hemolytic indice | | 229 | 164 |
| Icteric indice | | 2 | 2 |

Ion exchange selection and preconditioning: the ion exchange selected for this embodiment is a weak base anion exchange resin. The anion exchange resin is intended to adsorb lactate from the recirculating dialysate into which the lactate has diffused from the perfusate in the dialyzing filter. In the ion exchange resin, the lactate anion is exchanged for the chloride anion, which chloride is a normal constituent of blood.

The ion exchanger contains the weak anion exchange resin, Amberlite IRA 67 that reversibly binds anions to remove them from solution. To allow for swelling, the embodied 280 mL cartridge is loaded with 200 mL ion exchange resin. The dry resin anion capacity is 1.6 equivalents per liter; so, for perfusate of singly-charged anions the cartridge anion capacity is 310 millimoles. The perfusate comprises 50% red blood cells and 50% electrolyte solution totaling 0.75 liters.

If the ion exchange resin is preconditioned with acids whose anions match a perfusate anion such as chloride or carbonate, it would then release one mole of such perfusate constituent in exchange for each mole of lactate adsorbed. In one embodiment, preconditioning with hydrochloric acid (HCl) prepares the resin to exchange chloride anions for lactate anions in use. Embodiments may alternately precondition the anion exchange resin with carbonic acid, gluconic acid, or lactobionic acid as exemplary preconditioning to subsequently release carbonate, gluconate, or lactobionate anions into the perfusate in exchange for lactate.

The active ingredient in IRA 67 is a tertiary amine—a tertiary amine is a nitrogen molecule that is structurally similar to ammonia ($NH_3$), wherein the nitrogen has a single lone pair of electrons, but unlike ammonia, each of the bound hydrogens has been replaced with an organic group. The substrate is crosslinked acrylic gel. The IRA 67 resin is supplied in a free base form, which in this form advantageously uses the inherently basic nature of the tertiary amine to select and bind from solution the non-dissociated strong acids including their conjugate bases. It leaves behind the weaker acids; so, in the present application it will bind dissolved lactic acid. However, the free base form may also bind HCl from solution, potentially leaving behind some lactate while raising perfusate pH by scavenging protons. In one embodiment, the resin is preconditioned away from free base form into the chloride form by flowing HCl through it. This preconditioning step was used by authors Rojan et al[3] who used IRA 67 to recover lactic acid from cassava bagasse. The chloride form in their study yielded over 3× greater capacity (125 mg/g) compared to the free base form. This measured recovery matches approximately the rated capacity of the resin.

Author Bishai[4] described a similar preconditioning regime for Amberlite IRA 96, also a weak anion exchanger with similar specifications as the IRA 67 but having a Styrene DVB copolymer different from the IRA 67 acrylic gel. A significant difference between the resins is that the IRA 67 is approved for food use (21 CFR 173.25) whereas the IRA 96 is not.

For further reference, there is an anion exchanger approved for therapeutic use in human plasma contact, the Plasorba BR-350 (L) by Asahi Kasei. The Plasorba claims human application in clinical plasma purification but differs from the present invention in its direct contact with human plasma used for purification in a clinical system, different from the present invention which is in direct contact with dialysate in an organ and tissue application. Its mention herein exemplifies one case of suitability of ion exchange in a medical device, blood contact context, which suggests the eventual medical suitability of the present invention also.

The data sheet for IRA 67 indicates a regeneration process comprising 130% ionic load at 2 to 8 bed volumes (BV) per hour for at least 30 minutes. Also, 8 to 16 bed volumes may be fast-rinsed at 10 bed volumes per hour. By reference, the service flow rate is 4 to 40 bed volumes per hour. In the embodiment the bed volume is 280 mL.

The Rojan (and Bishai) preconditioning into chloride form is as follows:
1. Wash with 1N HCl
2. Wash with distilled water
3. Wash with 1N NaOH
4. Wash with distilled water
5. Wash with 1N HCl
6. Wash with distilled water until pH=7

Wash volumes and durations were not stated by these authors. However, combining the authors' sequences with the data sheets specified regeneration timing and rates, inventor used the following sequence in the embodiment:
1. Wash 30 minutes with 1M HCl at 14 mL/min (3 BV/h) (408 mL for every step)
2. Wash 30 minutes with distilled water at 14 mL/min (3 BV/h)
3. Wash 30 minutes with 1M NaOH at 14 mL/min (3 BV/h)
4. Wash 30 minutes with distilled water at 14 mL/min (3 BV/h)
5. Wash 30 minutes with 1M HCl at 14 mL/min (3 BV/h)
6. Wash with distilled water until pH=7 at 14 mL/min (3 BV/h)

Additional embodiments: Inventor incorporates herein additional embodiments that advantageously encompass the invention's intended scope. Such application includes various alternative components and their ordering within the described system, which otherwise accomplish its same or similar function or outputs. Embodiments include as previously mentioned, the complete range of organ perfusates and preservation solutions: intracellular and extracellular, normo-, hypo- and hyper-tonic, natural and synthetic, including blood-based and non-blood-based oxygen carriers such as Perfluorocarbons (PFCs). It includes the range of temperatures within which organs are perfused from subzero (−20° C.) to hyperthermic (39° C.). It includes the types, mixtures, and arrangements of one or more ion exchange resins including weak and strong anion and cation resins intended to both adsorb and release specified perfusate constituents, anions, cations, and combinations of both. Such resins can advantageously remove certain specified components from the perfusate and furthermore introduce others. Resins may be arrayed in series or parallel within multiple cartridges or mixed together within a single cartridge where feasible to achieve combined effects. To achieve exchange of specific constituents, resins may be preconditioned with specific ions, ionic liquids, and proteins complexed with ionic liquids. Such a complexed protein includes for example, CAGE-insulin, which as an ionic liquid is stored on the resin for gradual release. This would be an advantageous alternative to the manual or automated injection of agents such as insulin, otherwise performed by pump or manual action.

Evaluation of the embodiment involving disinfection: Tests were performed to observe performance of inactivating bacterial pathogens in the perfusate using the disinfection module 29. Observations were additionally made on the maintenance of perfusate chemistry. A perfusion system subset of the type of FIG. 1 was adapted to perform the test.

The following Table 6 lists the major constructional components comprised the test system:

TABLE 6

Major constructional components, disinfection test:

| Item | Name | Manufacturer | Part Number |
| --- | --- | --- | --- |
| 1 | Cassette | McMaster | 4787T64 |
| 7 | Needleless sampling port | Qosina | 80181 |
| 10 | Oxygenator | Medtronic | Trillium Affinity NT |
| 14 | Pump | Functional Circulation | G35-1501 |
| 27 | Temperature sensor | Cole Parmer | EW-98768-51 |
| 29 | Disinfection module | Functional Circulation | G35-1007 |
| 36 | Flow sensor | Functional Circulation | G30-0014 |
| 45 | Control PCB | Sparkfun | COM-13716 |
| 46 | UV emitter | Klaran | KL265-50V-SM-WD |
| 47 | UV shield | Functional Circulation | G35-0046K |
| 51 | Window | Functional Circulation | G35-0068 |

The perfusate is a mixture of 50% abattoir-collected, heparinized porcine blood and 50% electrolyte solution totaling 1000 mL perfusate. The electrolyte component is made of one bottle of premixed Krebs Ringers buffer (Sigma Aldrich K4002-1L), 3.78 grams sodium bicarbonate, and distilled water for each liter made. Table 3 provides the composition of the electrolyte solution used for both perfusate and dialysate:

The UV emission is provided by a bare LED device fastened to the UV shield by stainless steel clips, and electrically connected to the control PCB. The LED device disclosed and tested as UV emitter has a specified output power of 70 mW and a peak wavelength of 260 to 275 nanometers. Its nominal operating current is 500 mA for which it exhibits a forward voltage of 6.5 to 9 volts. For the test, the UV emitter received 660 mA provided at 50 Hz, and 50% duty cycle, resulting in an estimated peak power of 77 mW and estimated average power of 38.5 mW. The radial distance of emitter to perfusate was 7.5 mm resulting in an average energy flux of 4.7 mW/sq-cm.

A disinfection module was designed, constructed, and incorporated into the perfusion circuit to inhibit, e.g., kill, or disable, potential bacterial infection during VCA preservation. A 41-hour bench test was performed using module applied to perfused porcine blood and electrolyte perfusate at normothermic conditions.

Two perfusion circuits were operated in parallel for a total of 41 hours. Disinfection was applied to circuit #1 for 25 hours and then switched to circuit #2 for a subsequent 16 hours. All perfusate-contacting surfaces were autoclaved before the test, kept sealed during the test, and aseptic technique was used for blood handling. Perfusate was circulated at 100 to 130 mL per minute through each circuit comprising a pre-sterilized oxygenator and a cuvette with transparent window, so the disinfection source could be applied to each circuit in turn without breaking sterility. Temperature was maintained by a recirculating heater at 32 to 35° C. to the oxygenators. Samples were collected directly into Thermo EZ Draw aerobic and anaerobic bottles for bacterial culture, and by syringe for centrifugation and biochemistry. Collection was at 0, 15, 25, and 41 hours. Samples were shipped overnight warm for culturing and frozen for biochemistry to university veterinary pathology labs, who reported results for pathogen presence and biochemistry.

Summary of evaluation results: Bacteria were detected by culture at every sampling point. Identified bacteria included *Streptococcus, Staph., Pseudomonas* spp. *E. coli, Enterococcus*, and *Bacillus*, which would be normally expectable infections found in abattoir sources. A scoring system was devised summing the semi-quantitative levels for all pathogen species detected at each time point. Using this scoring system, initial infection levels declined for 25-hours for both the non-disinfected circuit and the disinfected circuit. At this 25-hour point, the detectable pathogen in both circuits was *Streptococcus d*. Sixteen hours later, at the 41 hour time point, the disinfected circuit showed an increase of pathogens (observed heavy cultures of *Streptococcus d., Escherichia c. Enterococcus f.*: total score=9) and the non-disinfected circuit showed a greater increase in pathogens (observed heavy culture of *Staphylococcus a., Strep, E. Coli*, and *Enterococcus*: total score=12). From an infection standpoint, both the disinfected and non-disinfected circuits performed comparably on the first day, and the disinfected circuit out-performed the non-disinfected circuit on the second day evidenced by its lower infection score. Comparably, the biochemistry data showed superiority of disinfected circuit for moderation of blood lysis (hemolysis), which is a marker of infection observable in blood testing. The hemolytic indice for the non-disinfected circuit reached a maximum score of 1000 within the initial 25 hours indicating maximum hemolysis. The disinfected circuit had comparatively reduced and delayed hemolysis, scoring 674 for the hemolytic indice at the same 25 hour timepoint. Recirculating lactate, another marker of blood infection was elevated at the 25-hour time point for the non-disinfected circuit (13.8 millimolar) compared 11.8 millimolar in the disinfected circuit. These relatively elevated infection metrics for the non-disinfected circuit at 25 hours, hemolysis and lactate, demonstrate that infection was progressing more rapidly there in the absence of active disinfection.

Additional embodiments for disinfection: The disinfection module described herein is an example and not intended to be limiting. Alternate construction wherein the optoelectronic and fluidic sub-modules are integrated into a single unit to be possibly presterilized, used once or for a limited time, then disposed are hereby disclosed. Other wavelengths outside the UV-C band, including wavelengths above and below the UV-C band are furthermore disclosed. Pulsing parameters and power parameters including those of shorter pulse duration and higher power and fluence are intended as incorporated within this invention. For the case of non-blood containing perfusates, higher energy levels and increased spectral bands are anticipated, for example the application of microwave or gamma radiation to the perfusate, wherein higher energy and ionizing radiation might be safely used in the absence of threat to damage of living cells. Although the flow condition of the disclosed invention is predominantly laminar, turbulent flow embodiments are furthermore disclosed.

The present inventor recognizes the necessity to improve the duration and quality of living vascularized structures held outside the body. Current limits on duration follow from deterioration of the perfusate, accumulation of waste products, and depletion of substrates within the necessarily sealed preservation system. Other previous approaches have attempted to address these problems by swapping-out the perfusate, infusing supplementary drugs and nutrients, and application of single pass dialysis including as studied by the inventor[1]. These previous approaches can be difficult to use and are non-portable, which portability is an important requirement for systems used in clinical transplant, where donation and transplantation occur at separate and distant locations and even internationally. The present invention presents advantages in portability and reliability by replacing the large volume of dialysate normally used in single-pass dialysis with a chemical adsorber device which can enable recirculation of reduced dialysate volumes, achievable in a self-contained, sealed system. The embodiment that removes lactate reduces a waste product whose deleterious effect includes the feedback inhibition of glycolysis. By removing this lactate waste, the energy producing machinery of the cells works better, and viability improvements are expected. The possibility of infection is a disadvantage In existing organ and perfusion approaches, particularly for increasing duration and normothermic conditions. Disinfection in the existing approaches is effected by the use of antibiotics, better sealing, and aseptic practices. These approaches are limited because they do not account for endogenous infective sources and do not well manage the over-use of antibiotics leading to antibiotic resistant pathogens. This disclosed invention describes a device for overcoming such shortcomings of existing approaches.

The present invention is a means to improve the function of organs and other vascularized structures after transplant by providing them a beneficial pre-transplant and preservation environment outside the body. Such a beneficial environment is enacted by removing waste products and providing nutrients, drugs, and endocrine agents to maintain chemically stable blood or perfusate. Legacy processes of adding beneficial agents while removing harmful ones remain technically underdeveloped, requiring human intervention, and are cumbersome and non-portable. This invention provides an improved means for portably providing exchange of harmful wastes from the perfusate and replacing them with normal or helpful ions and compounds. This invention provides a means of chemical exchange in a sealed and infection resistant system that does not require additional intervention to operate. The result of this system will be better function of transplants with reduced rejection, which will furthermore result in growth in transplantation overall and lifesaving relief for people with organ failure, amputation, or profound disfigurement.

It should be understood that a perfusate is a fluid that is perfused i.e., a fluid which flows or is pumped through a tissue, organ, bodily structure, i.e., at least part of the vascular vessels of the tissue, organ, or body structure, or is otherwise in contact with a tissue, organ, or body structure. In both case the perfusate is perfused so as to perform at least one of: remove waste products, exchange components of the perfusate with the tissue, organ, or body structure to preserve or substance the life of the tissue, organ, or body structure.

In the claims the term organ is defined to include: an organ, i.e., a part of an organism that is typically self-contained and has a specific vital function, a tissue i.e., groups of cells that have a similar structure and act together to perform a specific function, and body structures such as a hand, an arm, or a face.

The invention claimed is:

1. An organ preservation apparatus for circulating perfusate in contact with an organ, comprising:
 a chamber;
 a support platform within the chamber which forms a support for an organ thereon;
 a first fluid circuit having a perfusate pump arranged to circulate perfusate into contact with an organ supported on the support platform in the chamber;
 a first reservoir arranged to collect perfusate flowing from an organ in the chamber, wherein the first fluid circuit is arranged to return perfusate from the first reservoir through the perfusate pump to an organ located within the chamber; and a source of UV light positioned within a housing;

a hemispheric UV light transmissive window mounted to the housing;

a UV manifold mounted to the housing and having an internal passageway which expands to a perfusate UV chamber, wherein the internal passageway has an inlet ahead of the perfusate UV chamber, the inlet communicating with the first fluid circuit, and wherein the internal passageway has an outlet after the perfusate UV chamber which communicates with the first fluid circuit, and wherein the hemispheric UV transparent window extends into the perfusate UV chamber, the source of UV light being positioned in the housing to emit radial UV emissions through the hemispheric UV transparent window to pass into the perfusate UV chamber so that perfusate circulating in the first fluid circuit is exposed to UV light from the source of UV light within the perfusate UV chamber to inactivate pathogens in perfusate circulating in the first fluid circuit.

2. The organ preservation apparatus of claim 1 further comprising:

a dialysis device having a first compartment separated from a second compartment by a dialyzing filter;

a second fluid circuit having a second pump arranged to circulate dialysate from a second reservoir through the first compartment, the dializing filter and the second compartment of the dialysis device;

wherein the first fluid circuit is connected to the second compartment to pass perfusate on one side of the dialyzing filter to exchange wastes across the dialyzing filter from perfusate in the first fluid circuit to dialysate circulating in the second fluid circuit.

3. The organ preservation apparatus of claim 1 further comprising an ion exchange resin arranged in the second fluid circuit and arranged to contact dialysate circulating in the second fluid circuit to exchange ions with dialysate in the second fluid circuit wherein the ion exchange resin is a weak base anion exchange resin that is preconditioned to capture lactate ions from the dialysate.

4. The organ preservation apparatus of claim 1 wherein the first fluid circuit contains perfusate having at least one of electrolytes, nutrients, and an oxygen carrier.

5. The organ preservation apparatus of claim 1 wherein the second circuit contains dialysate further comprising at least one of electrolytes and nutrients.

6. The organ preservation apparatus of claim 1 wherein an oxygenator is arranged to be in fluid communication with perfusate in the first fluid circuit and is arranged to incorporate gas into perfusate in the first fluid circuit.

7. The organ preservation apparatus of claim 6 further comprising at least one gas concentration sensor disposed in a gas exhaust of the oxygenator, and further comprising a display or data communication link connected to the at least one gas concentration sensor.

8. The organ preservation apparatus of claim 1 wherein the source of UV light is aligned to a location approximating a geometric center of the hemispheric window, such that a ray pattern of radial UV emissions from the source of UV light impinge the hemispheric window normal to a hemispheric window surface to reduce refractive losses.

9. An organ preservation apparatus for circulating perfusate in contact with an organ, comprising:

a chamber;

a support platform within the chamber which forms a support for an organ thereon;

a first fluid circuit having a perfusate pump arranged to circulate perfusate into contact with an organ supported on the support platform in the chamber;

a first reservoir arranged to collect perfusate flowing from an organ in the chamber, wherein the first fluid circuit communicates with said first reservoir to return perfusate through the perfusate pump to an organ located within the chamber;

a dialysis device having a first compartment separated from a second compartment by a dialyzing filter;

a second fluid circuit having a second pump arranged to circulate dialysate from a second reservoir through the first compartment, the dialyzing filter and the second compartment of the dialysis device;

wherein the first fluid circuit is connected to the second compartment of the dialysis device to pass perfusate on one side of the dialyzing filter to exchange wastes across the dialyzing filter from perfusate in the first fluid circuit to dialysate circulating in the second fluid circuit; and an ion exchange resin arranged in the second fluid circuit and arranged to contact dialysate circulating in the second fluid circuit to exchange ions with dialysate in the second fluid circuit, wherein the ion exchange resin is a weak base anion exchange resin that is preconditioned to capture lactate ions from the dialysate;

a device arranged to apply pathogen inhibiting radiant energy to perfusate circulating in the first fluid circuit, wherein the device arranged to apply pathogen inhibiting radiant energy further comprises:

a source of UV light, and a UV light transmissive window having a first side arranged to receive UV light from the source of UV light, and a second side forming part of the first fluid circuit so that perfusate circulating in the first fluid circuit is exposed to UV light from the source of UV light to inactivate pathogens in perfusate circulating in the first fluid circuit, wherein the UV light transmissive window is hemispherical, such that perfusate flow follows a curved path within the first fluid circuit.

10. The organ preservation apparatus of claim 1 wherein the UV manifold is separable from the housing.

* * * * *